US005523923A

United States Patent [19]

Stowe, Jr.

[11] Patent Number: 5,523,923

[45] Date of Patent: Jun. 4, 1996

[54] VEHICLE REFLECTOR ILLUMINATING SYSTEM

[76] Inventor: George Stowe, Jr., 4488 W. 61st St., Los Angeles, Calif. 90043

[21] Appl. No.: 296,445

[22] Filed: Aug. 26, 1994

Related U.S. Application Data

[62] Division of Ser. No. 217,554, Mar. 25, 1994, Pat. No. 5,442,526.

[51] Int. Cl.$^6$ .......... B60Q 1/30

[52] U.S. Cl. .......... 362/61; 362/83.1; 362/83.3; 362/221; 362/265

[58] Field of Search .......... 362/61, 80.1, 83.1, 362/83.3, 221, 222, 265, 394; 340/463, 464, 468, 471, 472, 479; 315/77

[56] References Cited

U.S. PATENT DOCUMENTS 2,128,769 9/1938 Finnell .......... 340/464
2,671,207 3/1954 Marsala .......... 340/468
3,492,638 1/1970 Lane .......... 340/464
4,682,146 7/1987 Friedman, III .......... 362/263
4,931,697 6/1990 Nakamaji .......... 362/80
5,175,528 12/1992 Choi et al. .......... 340/471

*Primary Examiner*—James C. Yeung
*Assistant Examiner*—Sara Sachie Raab
*Attorney, Agent, or Firm*—Robert J. Schaap

[57] ABSTRACT

A reflector illuminating system for reflecting light incident on a reflector to provide a unique lighting effect and which is preferably, although not necessarily exclusively used, in connection with automotive vehicles. The reflector illuminating lighting system comprises an elongate frame with a light disposed in the frame for generating light to be incident upon a reflector normally provided on the vehicle, or other reflector which may be mounted on the vehicle for decorative purposes. The frame is mounted on the vehicle, or other supporting structure, in a position adjacent to an edge of the reflector so that generated light will be incident on the reflector at a substantial angle to the perpendicular surface of the reflector. The lighting system is provided with a wiring arrangement for connection to a source of electrical power. When used on a vehicle, the lighting system is connected to the electrical circuit of the vehicle itself.

19 Claims, 4 Drawing Sheets

VEHICLE REFLECTOR ILLUMINATING SYSTEM

RELATED APPLICATION

This application is a division of my U.S. patent application Ser. No. 08/217,554 filed Mar. 25, 1994, entitled "Vehicle Reflector Illuminating System" (now U.S. Pat. No. 5,442,526 dated Aug. 15, 1995).

BACKGROUND OF THE INVENTION

1. Field of the Invention

This invention relates in general to certain new and useful improvements in reflector illuminated lighting systems and particularly reflector illuminating lighting systems of this type for use in automotive vehicle and even more particularly, in a reflector illuminating lighting system for reflecting light incident on the reflector to provide a unique lighting effect.

2. Brief Description of the Prior Art

Light reflectors are commonly used in order to provide certain lighting effects and decorative effects. Reflecting light from these reflectors are effective where direct incident light is not desired and where the so-called see-through effect, that is, the effect of seeing through an element, is not desired. In many cases, it is necessary to provide a source of light which can be projected onto a reflector and reflected back from the reflector.

In many automotive vehicles, reflective surfaces are often employed. In some cases, these reflective surfaces or reflectors are located to become part of the decorative trim of the vehicle. In certain cases, the reflector may carry a design or symbol or the name of the automotive vehicle manufacturer. However, where the ambient light condition is relatively low, particularly at dusk and in evening hours, the reflector actually becomes a dark strip which may or may not cooperate with the remaining aesthetic appearance of the vehicle.

As a specific example of the foregoing, several automotive vehicles utilize a red reflector on the rear portion thereof with the name of the automotive vehicle manufacturer imprinted on this red surface. In broad daylight, the name of the automotive vehicle manufacturer is readily apparent. However, in darker lighting conditions, such as at dusk or in light, the name of the automotive vehicle manufacturer is not readily seen. Accordingly, one is merely left with a red reflector and in dark lighting conditions, the reflector appears to be nothing more than a black strip on the vehicle which may not necessarily add to the aesthetic appearance of the vehicle. Theoretically, light from a rearwardly located vehicle light beam will impinge upon the reflector and thereby display the name of the vehicle. However, unless the light is directed at the appropriate angle, the name of the manufacturer, or other indicia, still is not readily apparent to a viewer. As a result, and in this situation, the reflector may actually detract from the overall appearance of the vehicle.

Many individuals utilize an automotive vehicle as a means of enhancing or emulating certain status. Consequently, display of the name of the manufacturer of the vehicle may be important, particularly in connection with vehicles having a high cost associated therewith. As a result, many manufacturers resort to inclusion of the manufacturing company name on a portion of the vehicle.

There has not been any effective lighting system used in conjunction with a reflector for providing a unique lighting effect. This is particularly true in the case of providing a unique lighting effect from a reflector mounted on and forming part of an automotive vehicle. It would be desirable to provide such a lighting effect, particularly where there are low ambient light conditions so as to enhance the overall appearance of the vehicle.

OBJECTS OF THE INVENTION

It is, therefore, one of the primary objects of the present invention to provide a reflector illuminating lighting system for reflecting light incident on a reflector to provide a unique lighting effect.

It is another object of the present invention to provide a reflector illuminating lighting system which is adapted for use on and is particularly effective for use on an automotive vehicle.

It is a further object of the present invention to provide a reflector illuminating lighting system of the type stated which is adapted for use on a variety of vehicles having different vehicle lighting requirements and needs.

It is also an object of the present invention to provide a reflector illuminating lighting system of the type stated which includes a frame for mounting on a structural member of an automotive vehicle and which contains an elongate light generating means.

It is still another object of the present invention to provide a reflector illuminating lighting system of the type stated which can be connected to, and easily operable from, the electrical circuit of the automotive vehicle.

It is another salient object of the present invention to provide a reflector illuminating lighting system of the type stated which is highly effective in use and in operation and which can also be constructed at a relatively low cost and easily installed on numerous types of vehicles.

It is still a further object of the present invention to provide a reflector illuminating lighting system of the type stated in which there is little or no light directed to areas other than the reflector itself, so that one does not necessarily notice the light source used with the reflector illuminating lighting system of the invention.

With the above and other objects in view, my invention resides in the novel feature of form, construction, arrangement and combination of parts presently described and pointed out in the claims.

SUMMARY OF THE INVENTION

A reflector illuminating lighting system for reflecting light incident on a reflector to provide a unique lighting effect. The reflector illuminating lighting system is preferably, although not necessarily exclusively used in connection with automotive vehicles for illuminating a reflective element which may be factory included on the automotive vehicle, or otherwise, added to the automotive vehicle.

The reflector illuminating lighting system of the invention generally comprises an elongate frame. A light generating means is located on this elongate frame for generating light which is incident on the reflector. In this respect, the frame is designed so that there is little escape of light in areas other than for direct impingement upon the reflector.

A mounting means is associated with the frame for mounting the frame on a structure in a position in close proximity to and adjacent to the edge of the reflector. More particularly, the structure may include that structure forming part of an automotive vehicle. In accordance with this construction, light from the light generating means is incident on the reflector at a substantial angle to a perpendicular of a surface of a reflector. Thus, light reflects from the reflector at a substantial angle disposed perpendicular to the surface of the reflector, In accordance with the above-identified construction, the light effectively fans across the reflector and is not bounced as direct light rearwardly of the vehicle. Moreover, this direct light does not light other portions of the vehicle. It is for this reason that there is an angle between the direction of the light and the surface of the reflector, such that the light may approach, but does not reach, an angle where it is parallel to the surface of the reflector. It is desirable to have the light incident on the reflector at an angle from about 45 to about 75 degrees.

Also in a more preferred aspect of the invention, the elongate frame comprises a relatively flat base which is adapted for disposition of a structure in proximity to the reflector. The elongate frame is somewhat L-shaped and the base of the frame is in the form of a first leg which is adapted for attachment to the structure, such as the automotive vehicle. The frame comprises a second leg, generally perpendicular to the first leg. In this way, the second leg is generally at a right angle to the first leg. Furthermore, end sections extend around the ends of the elongate frame.

The reflector illuminating lighting system of the invention is also provided with means for connection to a source of electrical power. This source of electrical power may be any source suitable for energizing a lighting means, such as a neon or fluorescent lamp. When used on or in connection with a vehicle, the means for connecting to the source of electrical power generally provides for connection to the electrical circuit of the vehicle.

The vehicle reflector illuminating system of the invention is also effective in that it not only increases the aesthetic value of the vehicle, but it actually improves the safety factor. Due to the fact that the lighting portion of the reflector illuminating system actually lights the reflector, the vehicle becomes much more visible and hence, less likely to be involved in traffic accidents. In addition, the lighting source itself, such as the neon bulb, may have a length equal to the length of the reflector so that there is a complete illumination of all portions of the reflector. A cover, such as a neoprene transparent or translucent cover, may also extend over the light source, such as the neon lamp. In this way, the lamp is envelopingly enclosed in a protective liner and less likely to be subjected to damage. The ends of the wires which are connected to sockets for the lamp are preferably sealed in a silicone covering.

While the present invention has been described as using a neon light source, it should be understood that other forms of light sources could also be used in place of a neon lamp. For example, a fluorescent lamp could be employed, or a series of incandescent lamps could be mounted on the frame for illuminating the reflector. The neon light source is preferred, due to the fact that there is very little reflection from the light source itself, such that all light is impinged upon and reflected from the reflector mounted on or forming part of the vehicle. Furthermore, the neon lamp provides a soft lighting effect which is also desirable.

The invention also relates to an improvement in an automotive vehicle which has a body with a reflector on the portion of the body and lighting means for causing light to be incident on the reflector to enhance any surface marking or features on this reflector. In this case, the improvement comprises those features which were described above, such as the elongate frame, the lighting means, the mounting means and the means for connection to a source of electrical power.

The present invention has may other objects and advantages which will become more fully apparent from a consideration of the forms in which it may be embodied. These forms are illustrated in the accompanied drawings and are described in more detail in the following detailed description of this invention. However, it is to be understood that this detailed description and the accompanying drawings are only for purposes of illustrating and describing the general principles of the invention and are not to be taken in a limiting sense.

BRIEF DESCRIPTION OF THE DRAWINGS

Figure 1:
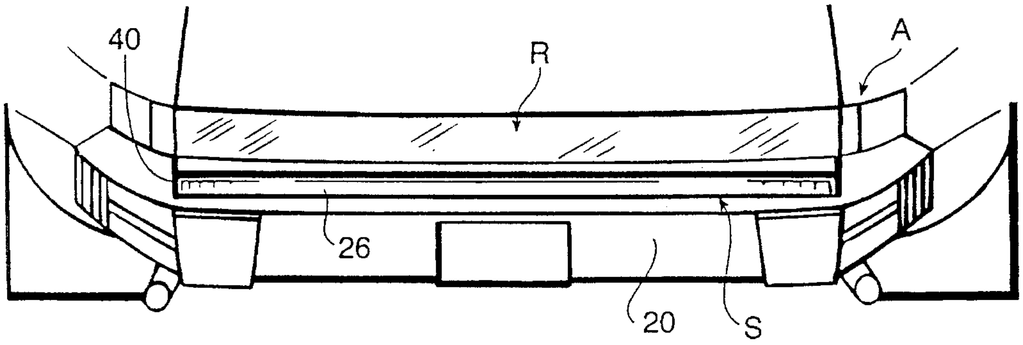
Figure 2:
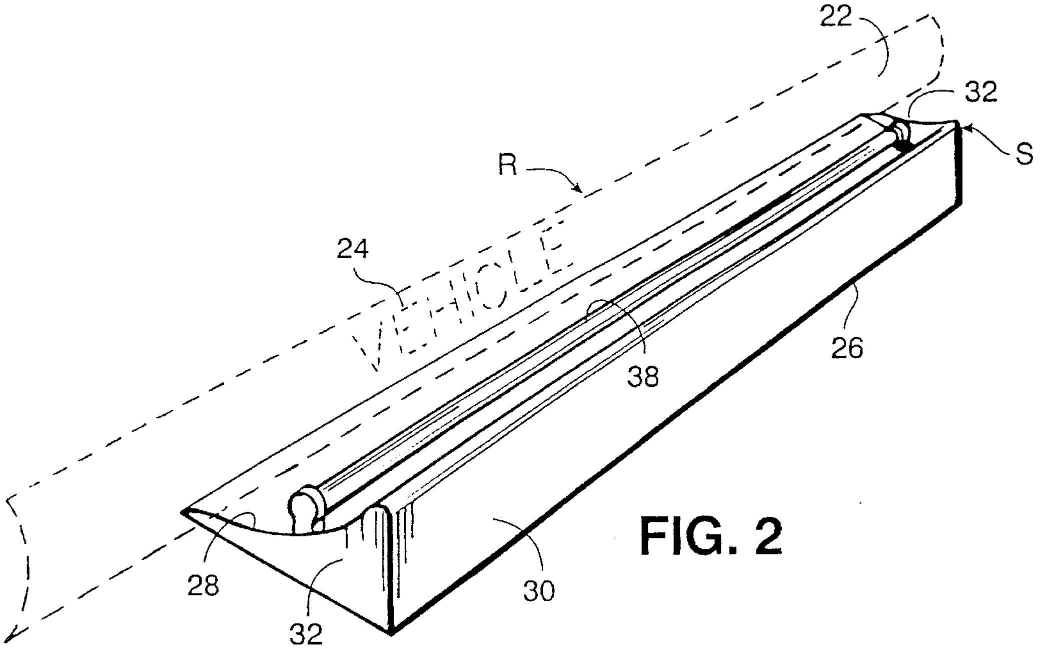
Figure 3:
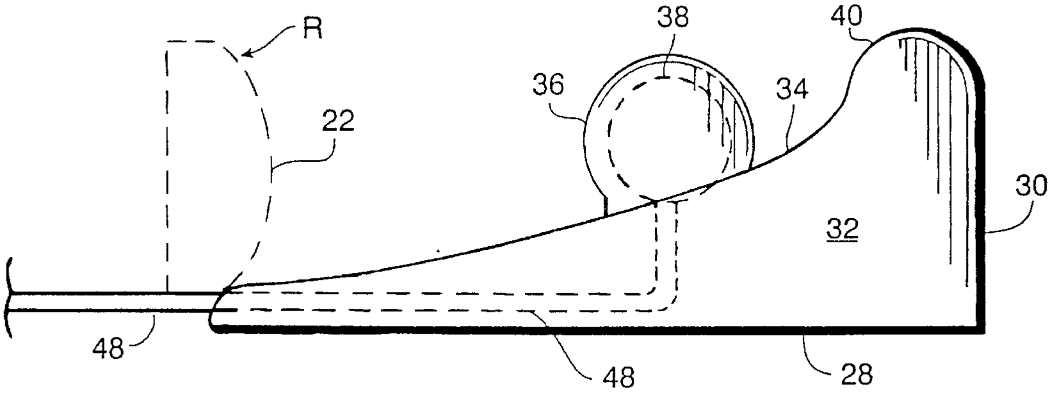
Figure 4:
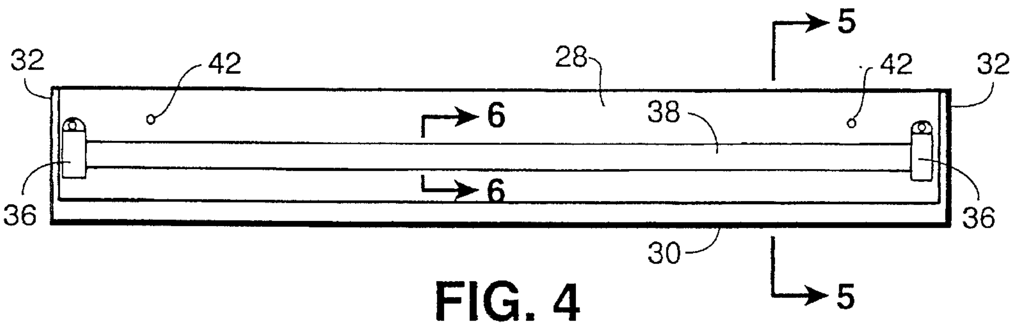
Figure 5:
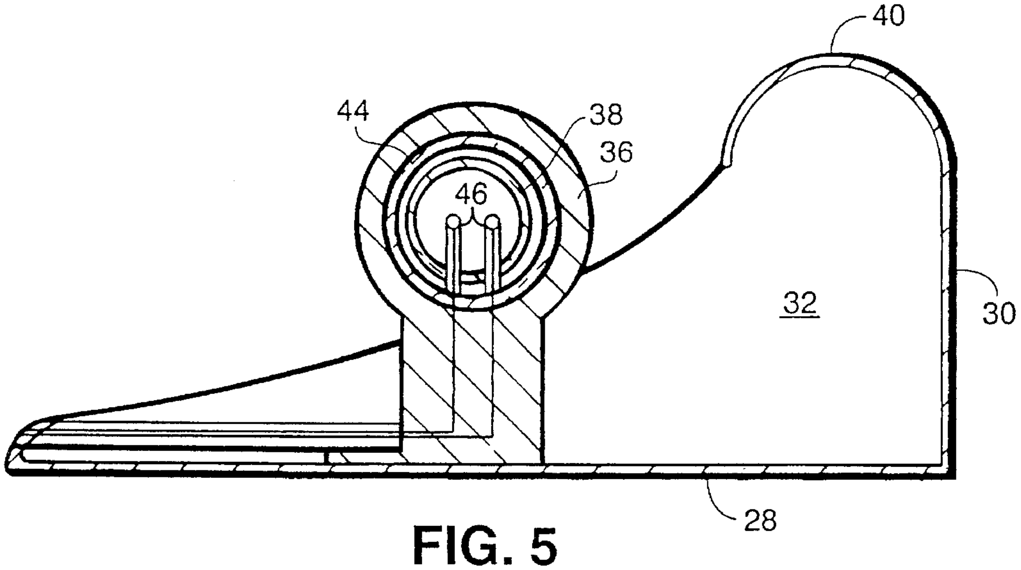
Figure 6:
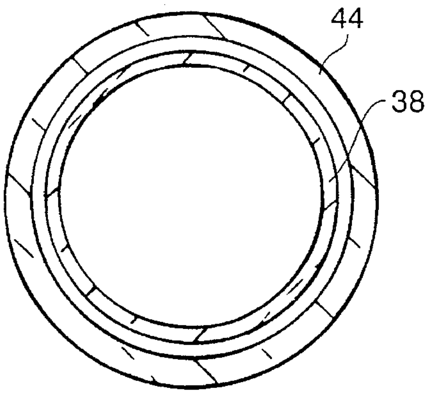
Figure 7:
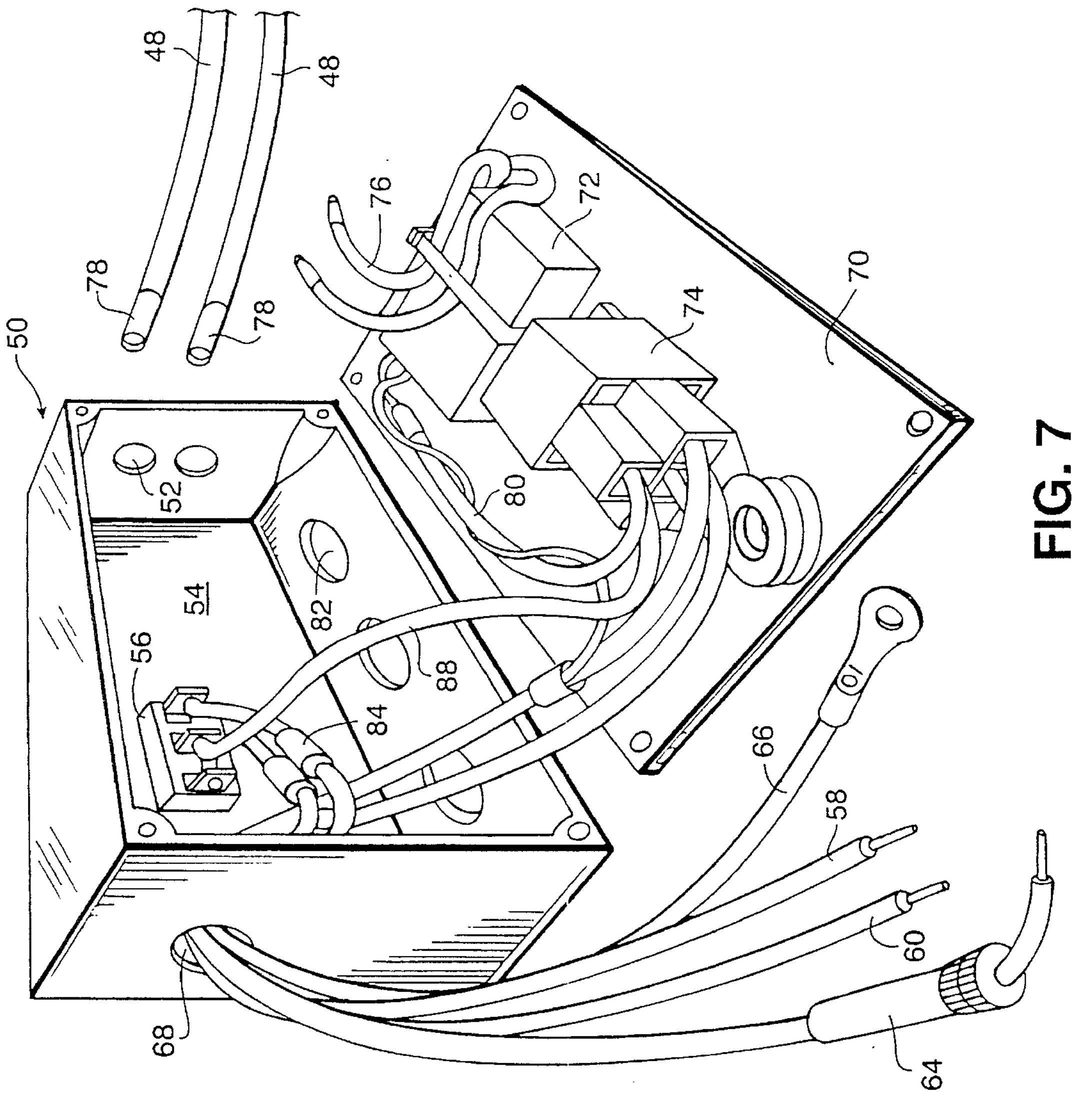
Figure 8:
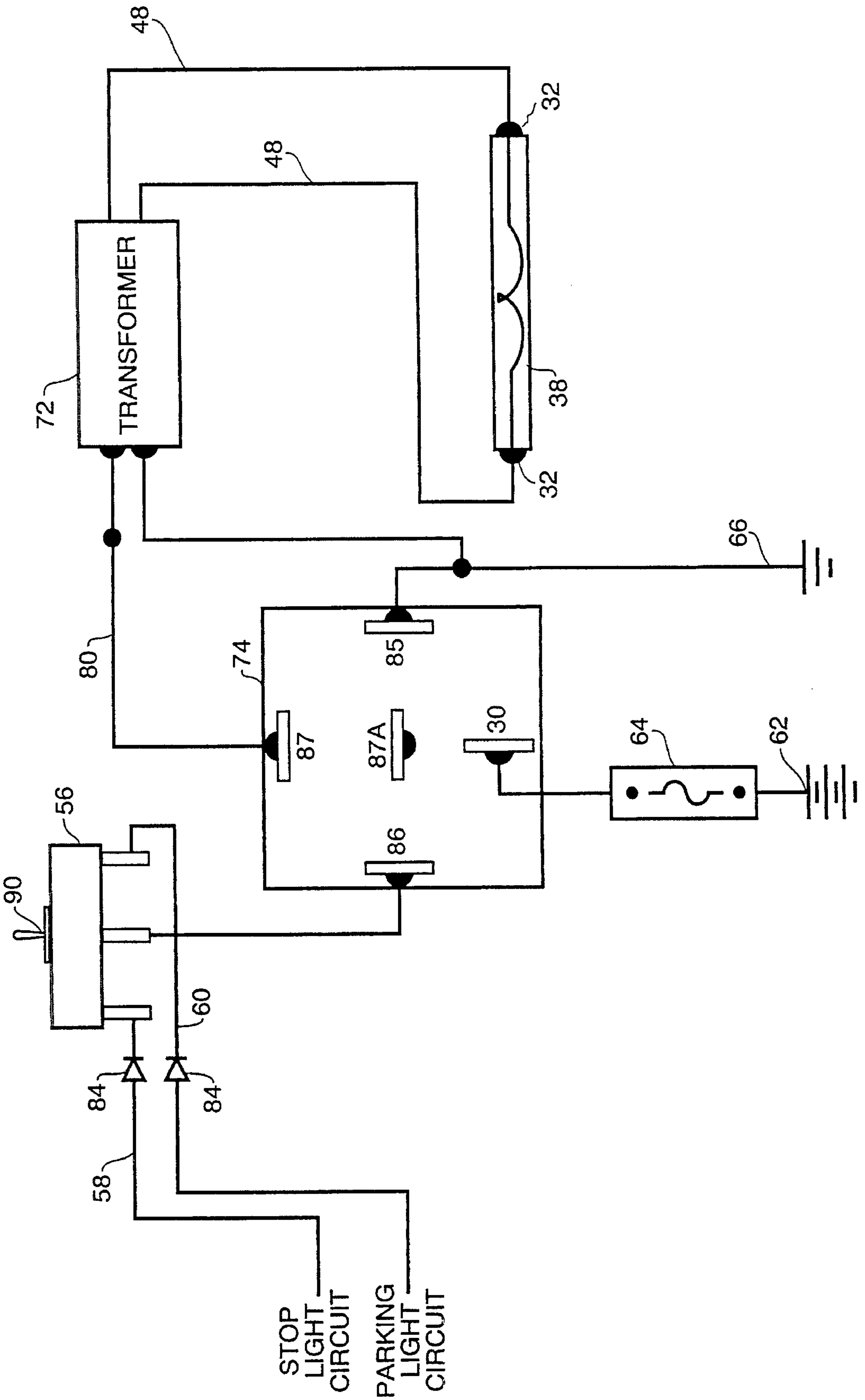

Having thus described the invention in general terms, reference will now be made to the accompanying drawings in which:

FIG. 1 is a rear elevational view of a portion of an automotive vehicle showing the vehicle reflector illuminating system of the present invention used therewith;

FIG. 2 is a perspective view of the vehicle reflector illuminating system in conjunction with a reflector forming part of a vehicle;

FIG. 3 is a side elevational view of the vehicle reflector illuminating system, show in operative relationship to a reflector on a vehicle;

FIG. 4 is a top plan view of the vehicle reflector illuminating system of the invention;

FIG. 5 is a vertical sectional view, taking along line 5—5 of FIG. 4;

FIG. 6 is a sectional view, taken along line 6—6 of FIG. 4;

FIG. 7 is a perspective view showing certain of the electrical components forming part of the vehicle reflector illumination system of the invention; and FIG. 8 is a schematic electrical circuit view showing the connection of the illuminating system to a circuit of an automotive vehicle.

DETAILED DESCRIPTION OF A PREFERRED EMBODIMENT

Referring now in more detail and by reference characters to the drawings, S designates an automotive vehicle reflector light system 20 used in conjunction with a reflector R forming part of or mounted on an automotive vehicle A. In this particular embodiment, as illustrated, the reflector R is mounted on a rear portion of the vehicle above the bumper 20 forming part of the automotive vehicle A. However, it should be understood that the vehicle reflector illuminating system S of the invention could be used with essentially any reflector on the vehicle and mounted at essentially any location on the vehicle.

Also in the embodiment as illustrated, the reflector R is shown as comprising an elongate reflector strip 22, having lettering or other indicia 24 thereon. The reflector R is more fully illustrated in phantom lines of FIGS. 2 and 3, inasmuch as it does not actually form part of the vehicle reflector illuminating system, but rather, is the object which is illuminated thereby.

The vehicle reflector illuminating system of the invention generally comprises an elongate frame or housing 26, having a base wall or bottom plate 28 and an integrally formed upstanding rear wall 30. A pair of end walls 32 are connected between the upstanding rear wall 30 and the bottom wall 28. The rear wall 30 and the base wall 28, along with the end walls 32, for a type of housing having an interior compartment 34 for receiving a pair of neon lamp sockets 36 at the opposite ends thereof. Furthermore, mounted within the sockets 36 is a conventional neon lamp 38. This lamp 38 serves as the light source forming part of the vehicle reflector illumination system of the invention.

By further reference to FIGS. 2 and 3, it can be seen that the elongate frame or housing 26 comprises an enlarged bead 40 on the rear wall 30 thereof, also as best illustrated in FIGS. 2 and 3 of the drawings. In this way, the neon lamp 38 is partially hidden by the bead 40 so that one will not necessarily observe the lamp 38 when viewing from the rear of the housing. The neon lamp 38 could also be effectively abutted against, or actually disposed within a well formed by the bead 40 and the rear wall 30, so as to be completely hidden from view.

A mounting means is provided for securing the frame housing 26 to the automotive vehicle. In the embodiment as illustrated, the vehicle has a shelf, such as a horizontal wall 40 for receiving the frame housing 26. However, any convenient portion of the vehicle could be used for securement of the frame housing 26. Also in the embodiment as illustrated, the mounting means comprises a plurality of mechanical fasteners, such as sheet screws 42. However, other mechanical-type fasteners, or other means for securement, could also be employed in accordance with the present invention.

The neon lamp 38 may also be enclosed within a protective sheath 44, as best illustrated in FIGS. 5 and 6 of the drawings. The sheath is preferably a plastic material, such as a transparent polyethylene film or the like and which may be wrapped about the lamp 38. In a more preferred embodiment, the sheath 44 is a type of circularly shaped envelope which fits around the lamp 38. Even more preferably, the sheath 44 should fit snugly about the lamp 44 and at least the end terminals of the lamp 38.

Referring again to FIG. 5, it can be seen that the neon lamp 38 is provided with a pair of electrodes 46. These electrodes cause energization of the neon lamp in a conventional manner and are therefore neither illustrated nor described in any further detail herein. However, the electrodes do extend beyond the lamp 38 as shown in FIG. 5 and are connected to electrical conductors 48 extending through the sockets 36. These electrical conductors thereupon extend forwardly through the frame housing 26 and are connected to the electrical circuit of the vehicle, in the manner as best illustrated in FIGS. 7 and 8 of the drawings.

The vehicle reflective lighting system of the invention is also capable of being used as an auxiliary rear light of the vehicle, such as a brake light. Inasmuch as many governmental standards now require the use of an auxiliary brake light, the vehicle reflective lighting system of the invention can satisfy that requirement or otherwise, operate in addition to an existing auxiliary brake light. The vehicle reflecting lighting system of the invention is also effective in that it operates with very low power consumption. For this purpose, the vehicle reflective lighting system of the invention can be used effectively as a parking light. Here again, the lighting system could be used in place of or in addition to the actual parking lights of the vehicle.

The electrical components which form part of the vehicle reflector illuminating system can all be suitably mounted within a box-like component housing 50, as best illustrated in FIG. 7 of the drawings. This component housing is designed to receive the electrical conductors 48 from the neon lamp 38. Moreover, the conductors extend through a pair of openings 52 formed in an end wall of the housing 50. The housing 50, itself, may be suitably stored within the trunk compartment of the vehicle and can literally be mounted within the trunk compartment, or any other convenient portion of the vehicle. Moreover, it can be constructed in the form of a small compact housing which assumes minimum space requirements.

Mounted on a rear wall 54 of the housing 50 is a toggle switch and preferably, a three-position toggle switch 56. One position of this toggle switch 56 may be used for operating a parking light circuit and another lead can be used for operating the stop light circuit. A third position could be used for an off/on switch position.

Connected to the toggle switch 56 is an electrical conductor 60 which is adapted for connection to the parking light circuit of the vehicle. In like manner, a conductor 58 is adapted for connection to the stop light circuit of the vehicle. A battery lead or conductor 62 is provided for connection to the battery or other source of electrical power. Furthermore, certain of the conductors, such as the conductor 62 which is connected to the source of electrical power, may be provided with fuse holders 64 suitably retaining fuses for overload protection. A further conductor 66 extends outwardly of the housing 50 and is effectively a ground line which cooperates with the battery lead 62 to form a complete circuit. In this respect, it can be observed that the conductors 58, 60, 62 and 66 all extend outwardly of a side wall of the housing through an opening 68 therein.

A cover plate 70 may be removably secured to the housing 50 to fully enclose same. The cover plate is removable in the manner as shown in FIG. 7, in order to provide access to the interior of the housing 50 for servicing or maintenance, as may be required.

Mounted on the interior surface of the cover plate 70 is a transformer 72 and preferably a 12 to 14.5 DC to 1,000 V AC transformer. The transformer 72 operates in conjunction with a circuit relay and preferably a 20 to 30 amp circuit relay 74, as also shown in FIG. 7 of the drawings. Extending from the transformer 72 is a pair of conductors 76 which are adapted for connection to fittings 78 on the ends of the electrical conductors 48.

An additional electrical conductor 80 is provided for connecting the relay 74 to the transformer 72, also as shown in FIG. 7 of the drawings. The housing 50 is provided with openings 82 for purposes of mounting the housing to a convenient portion of the automotive vehicle or other structure. Here again, any means for mounting the housing to a suitable supporting structure may be employed.

FIG. 8 illustrates one schematic representation of a conventional wiring circuit which may be used for connecting the vehicle reflector illuminating system of the invention to the electrical circuit of the automotive vehicle. By reference to FIG. 8, it can be seen that a pair of diodes 84 are also mounted in the conductors 58 and 60, as shown. Further, the relay has a relay line 88 which is connected to the toggle switch 56, also as shown in FIGS. 7 and S of the drawings. The relay 74 is a five-position relay, as illustrated and may be manually operable by a user in conjunction with the toggle switch 56. For this purpose, the toggle switch is provided with a manually actuable switch arm 90.

FIG. 8 effectively shows the wiring arrangement for connecting the vehicle reflector illuminating system of the invention directly to the electrical circuit of the vehicle. In this case, it can be observed that the electrical connections are relatively simple and can be easily installed and connected by even those relatively unskilled with vehicle electrical circuits.

Thus, there has been illustrated and described a unique and novel automotive reflector lighting system which enables light to be reflected from a reflector on the vehicle, providing unique and desired results therefrom. Thus, the automotive vehicle reflector lighting system of the invention fulfills all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by letters patent is:

1. A reflector illuminating lighting system for reflecting light from a vehicle light reflective surface and which is adapted for subsequent addition to a vehicle and connection to a vehicle after manufacture thereof and said lighting system further having a circuit arrangement which is operable through an electrical circuit of the vehicle, said lighting system comprising:

a) light generating means mounted on an exterior of a vehicle for generating light which is incident on a reflective surface on the exterior of the vehicle and reflected therefrom;

b) an electrical component housing mounted on said vehicle in a position where it is relatively unobservable and generally hidden from view to someone who is viewing the exterior of the vehicle;

c) switch means on said housing operable by a user of the illuminating lighting system and having a plurality of switch positions for operating the light generating means in response to operation of a stop light of the vehicle or a parking light of the vehicle or in an on-off condition;

d) relay means in said housing operable with the switch means for obtaining a desired operation in response to the switch position of the switch means;

e) said electrical component housing containing substantially all of the electrical components of the lighting system circuit arrangement with an exception of those components secured directly to the light generating means; and (f) conductive means extending from said housing for connection to the vehicle electrical circuit and which conductive means is also connected to said switch means and relay means.

2. The reflector illuminating lighting system of claim 1 further characterized in that said light generating means comprises a neon lamp.

3. The reflector illuminating lighting system of claim 2 further characterized in that said system comprises a frame adapted for mounting on the automotive vehicle and the reflector is a part of or mounted on the vehicle.

4. The reflector illuminating lighting system of claim 1 further characterized in that said vehicle electrical circuit includes the battery of the vehicle and said switch means is connected directly to said vehicle electrical circuit.

5. The reflector illuminating lighting system of claim 1 further characterized in that a transformer is connected in circuit relationship with said circuit means and relay means and is mounted within the housing.

6. The reflector illuminating lighting system of claim 5 further characterized in that said frame is an elongate frame and is somewhat L-shaped, said frame having a base in the form of a first leg adapted for attachment to said vehicle and a second leg generally perpendicularly disposed thereto.

7. The reflector illuminating lighting system of claim 1 further characterized in that said lighting system comprises:

a) an elongate frame;

b) said light generating means is on said elongate frame for generating light incident on said reflector; and c) mounting means is associated with said frame for mounting said frame on said vehicle in a position in close proximity to and adjacent to an edge of the reflector so that light from the light generating means is incident on said reflector at a substantial angle to a plane extending in perpendicular relationship to a surface of the reflector and where light reflected from the reflector is at substantial angles displaced from the plane extending perpendicular to the surface of the reflector.

8. The reflector illuminating lighting system of claim 1 further characterized in that said electronic component housing comprises an elongate housing having the switch means and relay means located therein and with conductive means extending from the housing and through openings in the housing to the light generating means.

9. In combination an automotive vehicle having a body with a reflector on a portion of the exterior of the body thereof and a lighting system having a lighting means and an electrical circuit arrangement operable through the electrical circuit of the vehicle for causing light to be incident on the reflector to enhance any surface marking or features thereof, said lighting system being adapted for subsequent addition to a vehicle after manufacture thereof by adding and connecting only the lighting means and electrical circuit arrangement to the electrical circuit of the vehicle, said combination comprising:

a) an elongate frame mounted on the exterior of the vehicle;

b) light generating means on said elongate frame for generating light which is incident on said reflector and which is reflected therefrom;

c) an electrical component housing mounted on said vehicle in a position where it is relatively unobservable from the exterior of the vehicle;

d) switch means on said housing operable by a user of the illuminating system and having a plurality of switch positions for operating the light generating means in response to operation of a stop light of the vehicle or a parking light of the vehicle or in an on-off condition;

e) relay means in said housing operable with the switch means for obtaining a desired operation in response to the position of the switch means;

f) said electrical component containing substantially all of the electrical components of the lighting system electrical circuit arrangement with an exception of those components secured directly to the light generating means; and g) conductive means extending from said housing for connection to the vehicle electrical circuit and which conductive means is also connected to said switch means and relay means.

10. The combination automotive vehicle and lighting system of claim 9 further characterized in that said light generating means comprises a neon lamp.

11. The combination automotive vehicle and lighting system of claim 9 further characterized in that said light generating means comprises an elongate frame mounted on the vehicle in proximity to said reflector.

12. The combination automotive vehicle and lighting system of claim 10 further characterized in that said elongate frame is somewhat L-shaped and has an elongate base in the form of a first leg attached to said vehicle body and a second leg generally perpendicularly disposed thereto.

13. The combination automotive vehicle and lighting system of claim 12 further characterized in that said second leg is generally an upright leg.

14. The combination automotive vehicle and lighting system of claim 12 further characterized in that a mounting means is on said frame and mounts said frame on said body in a position in close proximity to and adjacent to an edge of the reflector so that light from the light generating means is incident on said reflector at a substantial angle to a plane perpendicular to the surface of a reflector and where light reflects from the reflector at a substantial angle displaced from the plane perpendicular to the surface of the reflector.

15. The combination automotive vehicle and lighting system of claim 9 further characterized in that a battery of the vehicle is connected to and included in the electrical circuit of the vehicle and where the switch means is connected directly to the vehicle electrical circuit.

16. The combination automotive vehicle and lighting system of claim 15 further characterized in that a transformer is connected in circuit relationship with said switch means and relay means and is located within the housing.

17. The combination automotive vehicle and lighting system of claim 16 further characterized in that said transformer is connected electrically between said relay means and said light generating means.

18. The combination automotive vehicle and lighting system of claim 17 further characterized in that said combination comprises a cover plate for said electrical component housing, and said switch means is mounted in said housing and said relay means is mounted on said cover plate.

19. The combination automotive vehicle and lighting system of claim 18 further characterized in that the conductive means extends through apertures in said housing.

* * * * *